United States Patent

Rittmann

[15] 3,660,696

[45] May 2, 1972

[54] HALL EFFECT SWITCHING DEVICE

[72] Inventor: Albert D. Rittmann, Kokomo, Ind.

[73] Assignee: General Motors Corporation, Detroit, Mich.

[22] Filed: Jan. 14, 1970

[21] Appl. No.: 2,861

Related U.S. Application Data

[63] Continuation-in-part of Ser. No. 850,554, Aug. 15, 1969, abandoned.

[52] U.S. Cl. ....................307/309, 324/45

[51] Int. Cl. ....................H01c 7/16

[58] Field of Search ....................307/309; 338/32; 324/45

[56] References Cited

UNITED STATES PATENTS

| | | | |
|---|---|---|---|
| 3,008,083 | 11/1961 | Kuhrt et al. | 324/45 |
| 3,058,034 | 10/1962 | Sandin | 324/45 |
| 3,158,756 | 11/1964 | Brunner et al. | 307/309 |
| 3,221,261 | 11/1965 | Ertel | 307/309 |
| 3,365,665 | 1/1968 | Hood | 324/45 |

*Primary Examiner*—Donald D. Forrer
*Assistant Examiner*—Harold A. Dixon
*Attorney*—Jean L. Carpenter and Paul Fitzpatrick

[57] ABSTRACT

A Hall effect switching circuit including a Hall effect device having two input contacts and two output contacts. A source of electric power is connected across the two input contacts, and one of the output contacts is connected to the emitter of a transistor and the other output contact is connected to the base of the transistor through a diode. A resistor connects the base of the transistor to a terminal of the source of electric power.

1 Claims, 1 Drawing Figure

PATENTED MAY 2 1972 3,660,696
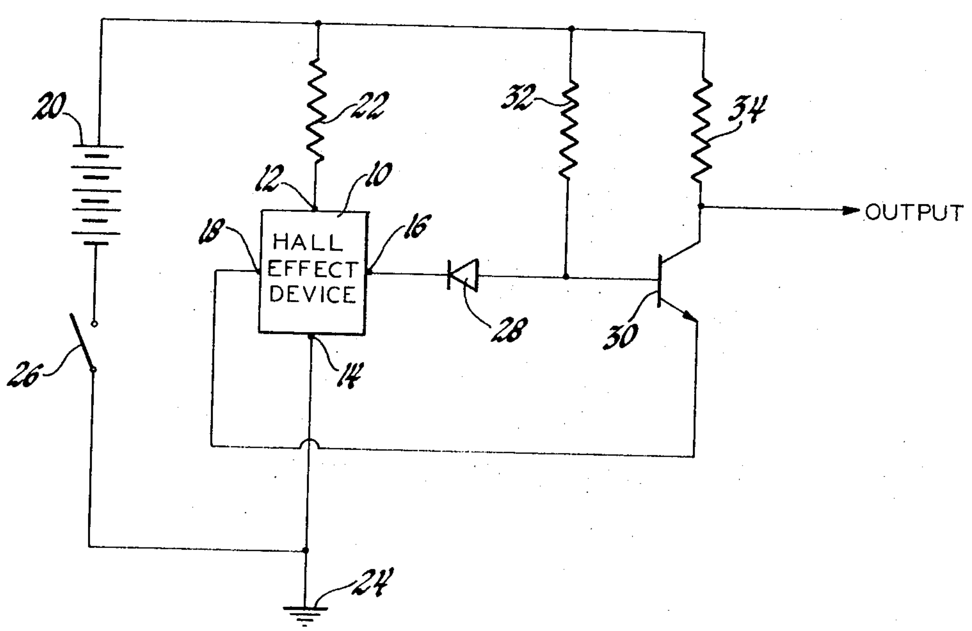
INVENTOR.
Albert D. Rittmann
BY
Paul Fitzpatrick
ATTORNEY

HALL EFFECT SWITCHING DEVICE

This application is a continuation-in-part of our application Ser. No. 850,554 for Hall Effect Switching Circuit, filed Aug. 15, 1969 now abandoned.

This invention relates to a Hall effect switching circuit and more specifically to a Hall effect switching circuit which is insensitive to temperature variations and supply voltage fluctuations and in which the switching action occurs at low output signals from the Hall effect device.

The Hall effect is a galvano-magnetic effect. If a magnetic field is applied to a current carrying conductor, electrons in the conductor are deflected in a direction perpendicular to both the current flow and magnetic field. Because the electrons must travel within the confines of the conductor, an excess of electrons on one side of the conductor relative to the other causes an electric field to be established which just opposes the force produced by the magnetic field. By applying suitable contacts to the sides of the conductor, it is possible to detect and utilize this Hall voltage.

The relationship between the Hall voltage and the applied voltage is directly proportional to the mobility of the conductor. Certain semiconductors, such as In Sb possess very high values of mobility and are therefore usually used in this application.

Hall effect switching circuits presently used connect a base electrode of a transistor to one of the output contacts of the Hall effect device by direct coupling or capacitive coupling and connect the emitter electrode of the transistor to ground. With temperature variations or supply voltage fluctuations, a change in the voltage on the contact connected to the base electrode occurs. This change in voltage affects the control of the transistor, whether it is in an "on" or "off" condition.

The object of this invention is to provide for a Hall effect switching circuit which is insensitive to temperature variations and supply voltage fluctuations and in which the switching action occurs with a very small output signal from the Hall effect device.

The invention may be best understood by reference to the following detailed description of a preferred embodiment when considered in conjunction with the accompanying drawing, which is a schematic of the Hall effect switching circuit incorporating the principles of the invention.

In using a Hall effect device in a switching circuit, a supply voltage is connected across the input contacts of the Hall effect device. When not under the influence of a magnetic field, the voltages on the two output contacts of the Hall effect device are equal and therefore the output signal of the Hall effect device is zero. When under the influence of a magnetic field, the voltages on the output contacts of the Hall effect device vary to produce a differential voltage output having a magnitude corresponding to the strength of the magnetic field. When this output is utilized to control a switch such as a transistor, the switch is turned on or off depending on the direction and strength of the magnetic field.

In addition to the voltages on the output contacts of the Hall effect device being dependent upon the strength of the magnetic field, the voltages on the output contacts vary with fluctuations in the supply voltage and with temperature changes. With a fluctuation in the supply voltage, the voltages on the output contacts vary but the magnitude of the output signal remains relatively unaffected by the supply voltage fluctuations since the voltages on the output contacts rise and fall together. Also, inasmuch as the Hall effect device is a majority semiconductor carrier device and inasmuch as this majority conduction varies with temperature, then the total resistance of the Hall effect device varies with temperature. The voltages on the output contacts increase with lower temperatures and decrease with higher temperatures. Although the voltages on the output contacts vary, the difference between the voltages, which represents the output of the Hall effect device, remains relatively unaffected by the temperature changes.

Referring to the drawing, a Hall effect device 10 has four ohmic contacts 12, 14, 16 and 18. The ohmic contacts 12 and

14 constitute the input contacts to the Hall effect device 10 as opposed to the output ohmic contacts 16 and 18. The ohmic contact 12 is connected to the positive terminal of a voltage source 20 through a resistor 22. The ohmic contact 14 is connected to a ground 24 and to the negative terminal of the voltage source 20 through a switch 26. A diode 28 has its cathode connected to the ohmic contact 16 of the Hall effect device 10 and has its anode connected to the base electrode of a transistor 30. A resistor 32 is connected between the base electrode of the transistor 30 and the positive terminal of the voltage source 20. A resistor 34 is connected between the collector electrode of the transistor 30 and the positive terminal of the voltage source 20. The emitter electrode of the transistor 30 is connected to the ohmic contact 18. For purposes of this description it may be noted that the term "connected to" refers to a "connection" that is substantially a direct wire path for current between two points in a circuit. This definition is widely used in the art and appears in the Electronics and Nucleonics Dictionary by John Markus (McGraw-Hill Book Company, third edition, 1966).

In operation, the conduction of the transistor 30 is determined by the forward voltage drop across the diode 28 and the voltage output of the Hall effect device 10 as taken between the ohmic contacts 16 and 18. The forward voltage drop across the diode 28 is nearly equal to the forward voltage drop across the base-emitter junction of the transistor 30. In addition, the thermal characteristics of the diode 28 is similar to that of the transistor 30 so that their characteristics remain the same. Therefore, the transistor 30 begins to conduct immediately upon the voltage on the ohmic contact 16 exceeding the voltage on the ohmic contact 18. This feature also minimizes any effect that temperature changes might have on the Hall effect device output.

The operation of this circuit can be best understood by considering the following conditions resulting from a magnetic field of varying strength and direction:

When the voltage on the ohmic contact 16 equals the voltage on the ohmic contact 18, the current flowing through the resistor 32 flows partially through the diode 28 and partially through the base and emitter of the transistor 30. When the voltage on the ohmic contact 16 exceeds the voltage on the ohmic contact 18, all the current being supplied through the resistor 32 flows through the transistor turning the transistor "on." When the voltage of the ohmic contact 18 exceeds the voltage on the contact 16, all current supplied through the resistor 32 flows through the diode 28 to turn the transistor 30 "off."

As previously described, even though the voltages on the ohmic contacts 16 and 18 may vary as a result of fluctuations in the voltage source 20 or temperature variations, the difference between the voltages on the ohmic contact 16 and the ohmic contact 18 remain relatively constant for a given magnetic field strength. Therefore, the conduction of the transistor 30 is unaffected by fluctuations in the supply voltage 20 or temperature variations.

What has been described is a Hall effect switching circuit whose operation is unaffected by changes in the source voltage and temperature and which operates with a minimum input.

What is claimed is:

1. A Hall effect switching circuit including the combination of a Hall effect device having at least first, second, third and fourth contacts, whereby the first and second contacts constitute the input contacts and the third and fourth contacts constitute the output signal contacts, a source of electric power having a first terminal connected to the first contact and a second terminal connected to the second contact; a transistor having a collector electrode connected to the first terminal, an emitter electrode directly connected to the third contact, and a base electrode; a resistor connected between the base electrode and the first terminal; and a diode having one electrode directly connected to the base electrode and another electrode directly connected to the fourth contact so as to compensate for changes in the transistor characteristics due to temperature variations and to cause the transistor to switch at a low output signal from the Hall effect device and thereby render the Hall effect switching circuit less sensitive to temperature variations and fluctuations in the source of electric power, whereby the Hall effect switching circuit is operative from the output signal across the third and fourth contacts so as to be rendered further insensitive to changes in the Hall effect device characteristics due to temperature variations and to fluctuations in the source of electric power.

* * * * *